US012494120B2

(12) United States Patent
Denich et al.

(10) Patent No.: US 12,494,120 B2
(45) Date of Patent: Dec. 9, 2025

(54) METHOD FOR UPDATING TRAFFIC INFORMATION RELATING TO A VEHICLE, COMPUTER-READABLE MEDIUM, SYSTEM, AND VEHICLE

(71) Applicant: Bayerische Motoren Werke Aktiengesellschaft, Munich (DE)

(72) Inventors: Christian Denich, Munich (DE); Sabrina Denich, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 147 days.

(21) Appl. No.: 18/550,042

(22) PCT Filed: Jan. 21, 2022

(86) PCT No.: PCT/EP2022/051373
§ 371 (c)(1),
(2) Date: Sep. 11, 2023

(87) PCT Pub. No.: WO2022/199901
PCT Pub. Date: Sep. 29, 2022

(65) Prior Publication Data

US 2024/0177598 A1 May 30, 2024

(30) Foreign Application Priority Data

Mar. 26, 2021 (DE) ..................... 10 2021 107 717.6

(51) Int. Cl.
*G08G 1/00* (2006.01)
*G08G 1/01* (2006.01)
*G08G 1/0967* (2006.01)

(52) U.S. Cl.
CPC ..... *G08G 1/0125* (2013.01); *G08G 1/096775* (2013.01)

(58) Field of Classification Search
CPC ........... G08G 1/0125; G08G 1/096775; G08G 1/0967; G08G 1/096741; G08G 1/00
(Continued)

(56) References Cited

U.S. PATENT DOCUMENTS

2008/0183375 A1* 7/2008 Okude ............ G08G 1/096741 701/451

FOREIGN PATENT DOCUMENTS

| | | | |
|---|---|---|---|
| DE | 10110549 | A1 | 9/2002 |
| DE | 102009037087 | A1 | 2/2011 |
| DE | 102014203268 | A1 | 8/2014 |

OTHER PUBLICATIONS

International Search Report corresponding to International Patent Application No. PCT/EP2022/051373, dated May 2, 2022 (4 pages).
(Continued)

*Primary Examiner* — Shardul D Patel
(74) *Attorney, Agent, or Firm* — Maginot, Moore & Beck LLP

(57) ABSTRACT

A method updates traffic information relating to a vehicle. The method includes ascertaining a change in traffic information for each road section of a navigation map responsive to a request message from the vehicle. The method also includes determining a criticality value for the ascertained change in the traffic information for each road section, and determining a relevance value for each ascertained change. A volume of change of the traffic information relating to the navigation map is calculated based at least in part on the ascertained changes in the traffic information, the determined criticality value, and the determined relevance value for all road sections of the navigation map. The method includes transmitting a response message comprising the traffic information if the calculated volume of change exceeds a predefined threshold value. The vehicle can
(Continued)

update the traffic information relating to the vehicle based on the transmitted response message.

20 Claims, 1 Drawing Sheet

(58) Field of Classification Search
USPC .......................................................... 701/118
See application file for complete search history.

(56) References Cited

OTHER PUBLICATIONS

Written Opinion corresponding to International Patent Application No. PCT/EP2022/051373, dated May 2, 2022 (9 pages).
German Search Report corresponding to German Patent Application No. 10 2021 107 717.6, dated Dec. 21, 2021. (8 pages).

* cited by examiner

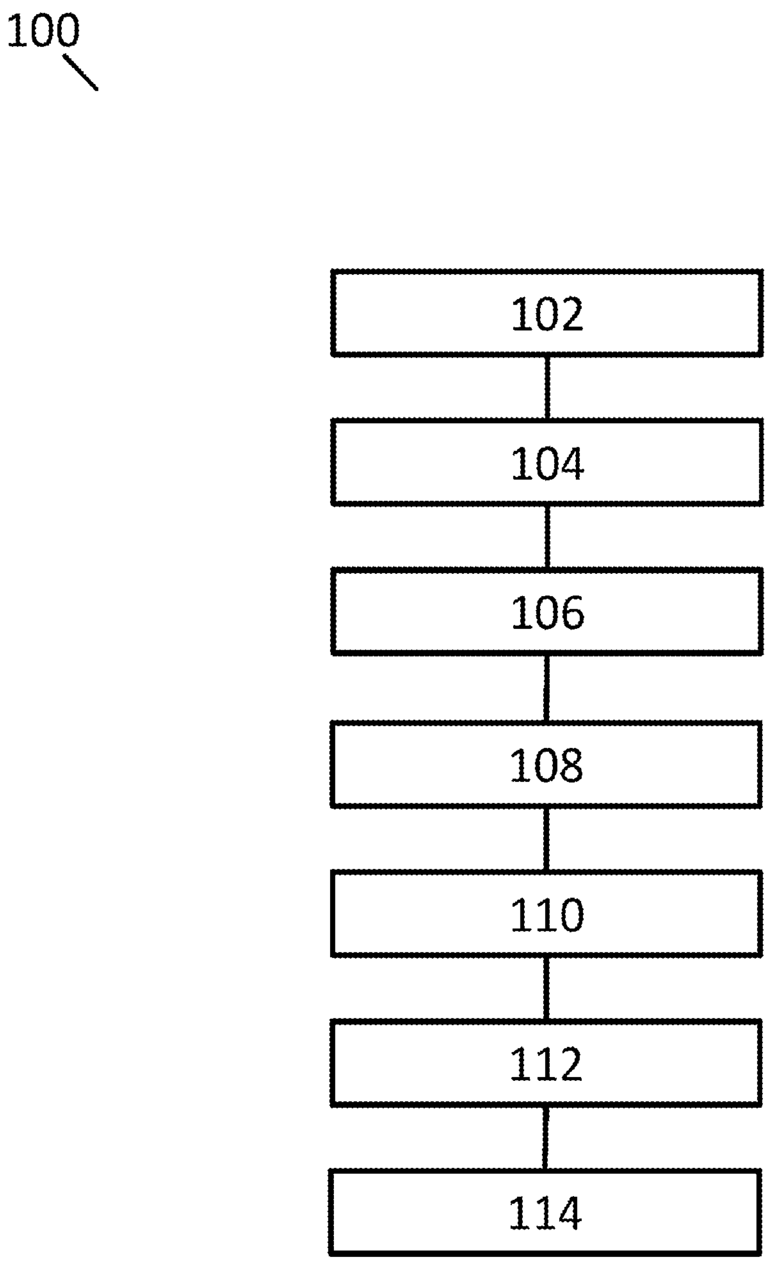
100
102
104
106
108
110
112
114

METHOD FOR UPDATING TRAFFIC INFORMATION RELATING TO A VEHICLE, COMPUTER-READABLE MEDIUM, SYSTEM, AND VEHICLE

The present application is the U.S. national phase of PCT Application PCT/EP2022/051373 filed on Jan. 21, 2022, which claims priority of German patent application No. 102021107717.6 filed on Mar. 26, 2021, which is incorporated herein by reference in its entirety.

TECHNICAL FIELD

The disclosure relates to updating traffic information relating to a vehicle.

BACKGROUND

Traffic information, often also referred to as Real Time Traffic Information, RTTI for short, which can be transmitted from a server to vehicles is known from the prior art. In order to update the traffic information, vehicles can transmit requests to a server. The server provides the traffic information to the vehicles in response to the requests from the vehicles. The traffic information is often displayed in the form of text messages and/or in the form of color visualizations integrated in navigation maps of the vehicles. The transmitting of the traffic information involves a large quantity of data of the traffic information which is transmitted from the server to the vehicles.

There is a need, therefore, for methods and apparatus that update traffic information relating to a vehicle in a more efficient manner, and that provide traffic information to a vehicle in a more efficient manner.

SUMMARY

The above described needs, as well as others, are addressed by embodiments described herein.

A first aspect is characterized by a method for updating traffic information relating to a vehicle. The traffic information relating to the vehicle is preferably traffic information relating to a navigation map of the vehicle. The method can be a method implemented by a computer and/or a method implemented by a control unit. The vehicle can be a motor vehicle. The traffic information can be real-time traffic information and/or predicted, future traffic information. The method comprises receiving, from the vehicle by means of a server outside the vehicle, a request message to update the traffic information relating to a navigation map of the vehicle. The server outside the vehicle can be a server of a cloud computing system. The server outside the vehicle can receive request messages from a multiplicity of vehicles. A vehicle can transmit, to the server outside the vehicle, a request message to update the traffic information relating to the navigation map at predefined, regular time intervals and/or on the basis of events.

The method further comprises ascertaining, by means of the server outside the vehicle, a change in traffic information for each road section of the navigation map on the basis of the request message from the vehicle. Furthermore, the method comprises determining a criticality value for the ascertained change in the traffic information for each road section of the navigation map, determining a relevance value for the ascertained change in the traffic information for each road section of the navigation map, and calculating a volume of change of the traffic information relating to the navigation map on the basis of the ascertained changes in the traffic information, the determined criticality value, and the determined relevance value for all road sections of the navigation map. The method transmits, from the server outside the vehicle to the vehicle, a response message comprising the traffic information for the navigation map of the vehicle if the calculated volume of change exceeds a predefined threshold value. Finally, the method comprises updating, by means of the vehicle, the traffic information relating to the vehicle on the basis of the transmitted response message.

Advantageously, the method can ascertain vehicle-specific traffic information and transmit it to the vehicle. The traffic information is only transmitted if a predefined threshold value for a volume of change of the traffic information is exceeded. That way only traffic information that has particular importance for the vehicle making the request is transmitted to the vehicle. Furthermore, only traffic information the sum of changes of which is significant for the user of the vehicle is transmitted. Consequently, the method can efficiently reduce the data volume of traffic information that needs to be transmitted, without having an adverse impact on the use of an updated navigation map for a vehicle user.

According to an advantageous configuration, the message to update the traffic information relating to the vehicle can be received from the vehicle by means of a server outside the vehicle following start-up of a vehicle or of a control unit of the vehicle, and/or the request message can comprise at least one identifier that is representative of an update status of a navigation map of the vehicle, and/or the navigation map can be specified by the at least one received identifier.

According to a further advantageous configuration, the ascertaining of the change in traffic information for each road section of the navigation map by means of the server outside the vehicle on the basis of the request message from the vehicle can comprise determining a relative change in the traffic information for each road section of the navigation map between a time of a past request message from the vehicle and a current time on the basis of the request message from the vehicle. The change in the traffic information can thus take place in an efficient and vehicle-specific manner.

According to a further advantageous configuration, the determining of a criticality value for the ascertained change in the traffic information for each road section of the navigation map can comprise determining an amount of the ascertained change in the traffic information for each road section; determining a visualization change for the ascertained change in the traffic information for each road section; and determining the criticality value on the basis of the determined visualization change and of the amount of the ascertained change in the traffic information for each road section. The importance of the traffic information can thus be ascertained in an efficient manner.

According to yet a further advantageous configuration, the ascertained change in the traffic information can be a change in speed of vehicles on the road section.

According to another advantageous configuration, determining of the relevance value for the ascertained change in the traffic information for each road section of the navigation map can comprise ascertaining, by means of the server outside the vehicle, a current position of the vehicle, determining a region around the current position of the vehicle and/or a region around a current navigation route of the vehicle, and ascertaining the relevance value for the ascertained change in the traffic information of a road section on the basis of the current position of the vehicle, the region around the current position of the vehicle, and/or the region around the current navigation route of the vehicle. The importance of the traffic information for the vehicle making the request can thus be ascertained in an efficient manner.

According to a further advantageous configuration, the method can further comprise transmitting a response message from the server outside the vehicle to the vehicle. The response message can comprise an indication that the predefined threshold value has not been exceeded if the calculated volume of change does not exceed a predefined threshold value.

According to a further advantageous configuration, the response message comprising the traffic information for the navigation map of the vehicle can be transmitted from the server outside the vehicle to the vehicle using the Transport Protocol Group, TPEG Experts for short, protocol, and/or the traffic information for the navigation map can be transmitted in the response message by road section, and/or the traffic information for a plurality of road sections can be combined in the response message. The traffic information can thus be transmitted to the vehicle in an efficient manner.

A further aspect is characterized by a computer-readable medium for updating traffic information relating to a vehicle, wherein the computer-readable medium comprises instructions which, when executed on a computer and/or a control unit, perform the above-described method.

A further aspect is characterized by a system for updating traffic information relating to a vehicle, wherein the system is designed to perform the above-described method.

A further aspect is characterized by a vehicle comprising the above-described system for updating traffic information relating to the vehicle.

Further features will become apparent from the claims, the figures and the description of the figures. All the features and combinations of features mentioned above in the description and the features and combinations of features mentioned below in the description of the figures and/or shown in the figures themselves can be used not only in the respectively specified combination but also in other combinations or else by themselves.

A preferred exemplary embodiment is described below on the basis of the attached drawings. Further details, preferred configurations and developments of the invention will become apparent therefrom.

BRIEF DESCRIPTION OF THE DRAWING

FIG. 1 schematically shows an exemplary method for updating traffic information relating to a vehicle.

DETAILED DESCRIPTION

In detail, FIG. 1 shows an exemplary method 100 for updating traffic information relating to a vehicle. In particular, the method 100 can update traffic information relating to a navigation map of the vehicle. The navigation map can comprise one or more predefined parts. One part of the navigation map can comprise a location, an area, a country, a continent, and/or another geographical region. One or more parts of the navigation map can be stored on a navigation system of the vehicle.

The method 100 can receive 102, from the vehicle by means of a server outside the vehicle, a request message to update the traffic information relating to a navigation map. The request message can comprise a preferably unique identifier of the vehicle. In addition or alternatively, the vehicle can comprise one or more identifiers of the navigation map and/or parts of the navigation map which are stored on the vehicle. In addition or alternatively, the request message can comprise an indicator of the update status of the traffic information relating to the vehicle. Alternatively, the server outside the vehicle can store an indicator of the update status for the vehicle, in particular an indicator of the update status for each vehicle. The server outside the vehicle can use the indicator of the update status to check which traffic information was transmitted to the vehicle during a previous updating of the traffic information.

Furthermore, the method 100 can ascertain 104, by means of the server outside the vehicle, a change in traffic information for each road section of the navigation map on the basis of the request message from the vehicle. The server outside the vehicle can, for example, use the identifier of the navigation map and/or the identifiers of the parts of the navigation map in the request message from the vehicle to ascertain the navigation map and/or parts of the navigation map for which the server outside of the vehicle ascertains one or more changes in the traffic information. For parts of the navigation map for which no identifiers are available in the request message from the vehicle, the server outside the vehicle preferably ascertains no traffic information. The server outside the vehicle can determine the changes in the traffic information by road section, wherein the road sections are defined by the navigation map and/or parts of the navigation map. In detail, the server outside the vehicle can determine a relative change in the traffic information for each road section of the navigation map between a time of a past request message from the vehicle and a current time on the basis of the request message from the vehicle. In other words, the server outside the vehicle can ascertain the changes in the traffic information for the vehicle which the request message has transmitted to the server. For example, the server outside the vehicle can ascertain that the vehicles on the road section at the time of the past request message were traveling at 40 km/h and the current speed of the vehicles on the road section is 45 km/h.

Furthermore, the method 100 can determine a criticality value for the ascertained change in the traffic information for each road section of the navigation map. The criticality value indicates how important the ascertained change in the traffic information is. The criticality value can be ascertained by one or more predefined rules and/or a predefined function on the basis of a speed and/or a speed difference.

A high speed difference, for example a speed difference of +10 km/h or of −10 km/h, can be critical. A small speed difference of for example +2 km/h or −2 km/h can also be critical if this speed difference leads to the traffic information being provided to a user of the vehicle in a different way, for example, if a visualization of the traffic information in the navigation system of the vehicle changes, an event regarding a change to a navigation route, and/or an event regarding a navigation-related indication message or warning message to the user of the vehicle results therefrom. Smaller changes in the speed, for example +2 km/h or −2 km/h, or medium changes in the speed, for example +5 km/h or −5 km/h, can be specified as less critical if no changes for the user of the vehicle result therefrom.

The method 100 can determine 108 a relevance value for the ascertained change in the traffic information for each road section of the navigation map. The relevance value can be ascertained for the vehicle making the request. The relevance value for the vehicle can be ascertained on the basis of a current position of the vehicle, a current navigation route, and/or a historical driving profile of the vehicle. The relevance value is preferably higher the closer the ascertained change in the traffic information is to the current position of the vehicle, to the current navigation route, and/or to the historical driving profile. For example, a surrounding area around the current position of the vehicle can be defined. If the change in the traffic information is within the defined surrounding area, a high relevance value can then be set. If the change in the traffic information is outside the defined surrounding area, a low relevance value can be set.

Furthermore, the method 100 can calculate 110 a volume of change of the traffic information relating to the navigation map on the basis of the ascertained changes in the traffic information, the determined criticality value, and the determined relevance value for all road sections of the navigation map. Generally, the volume of change can be defined by the following function: volume of change=f (changes, relevance, criticality). For example, the volume of change can be calculated as the sum of the product of the relevance value and the criticality value for all changes k=0 to k=n:

$$\sum_{k=0}^{n} \text{relevance}_k * \text{criticality}_k$$

Alternatively, the volume of change can be calculated by means of the following exemplary functions:

$$\sum_{k=1}^{n} \alpha * \text{relevance}_k * \beta * \text{criticality}_k$$

$$\sum_{k=1}^{n} (\text{relevance}_k)^{\alpha} * (\text{criticality}_k)^{\beta}$$

where α and β are weighting factors of the relevance value and criticality value, respectively.

The method 100 can transmit 112, from the server outside the vehicle to the vehicle, a response message comprising the traffic information for the navigation map of the vehicle if the calculated volume of change exceeds a predefined threshold value. If the calculated volume of change does not exceed the predefined threshold value, the method can transmit, from the server outside the vehicle to the vehicle, a response message comprising an indication that the predefined threshold value has not been exceeded. Finally, the method 100 can update 114, by means of the vehicle, the traffic information relating to the vehicle on the basis of the transmitted response message.

Advantageously, the method can provide vehicle-specific updates of traffic information. The updates of traffic information are only provided to the vehicle if the volume of change, as an indicator of the importance of the changes in the traffic information for the vehicle, exceeds a predefined threshold value. As a result, the traffic information data that needs to be transmitted can be reduced in an efficient manner, without a user of the vehicle having to do without the traffic information that is critical and relevant to them.

LIST OF REFERENCE SIGNS

100 Method
102 Receiving a request message
104 Ascertaining a change
106 Determining a criticality value
108 Determining a relevance value
110 Calculating a volume of change
112 Transmitting a response message
114 Updating the traffic information

The invention claimed is:

1. A method for updating traffic information relating to a vehicle, the method comprising:

receiving from the vehicle, using a server outside the vehicle, a request message to update the traffic information relating to a navigation map of the vehicle;

ascertaining, using the server outside the vehicle, a change in traffic information for each road section of the navigation map on the basis of the request message from the vehicle;

determining a criticality value for the ascertained change in the traffic information for each road section of the navigation map;

determining a relevance value for the ascertained change in the traffic information for each road section of the navigation map;

calculating a volume of change of the traffic information relating to the navigation map based at least in part on the ascertained changes in the traffic information, the determined criticality value, and the determined relevance value for all road sections of the navigation map;

transmitting, from the server outside the vehicle to the vehicle, a response message comprising the traffic information for the navigation map of the vehicle if the calculated volume of change exceeds a predefined threshold value; and wherein the response message is configured such that the vehicle can update the traffic information relating to the vehicle based at least in part on the transmitted response message.

2. The method as claimed in claim 1, further comprising updating, using the vehicle, the traffic information relating to the vehicle based at least in part on the transmitted response message.

3. The method as claimed in claim 1, wherein the message to update the traffic information relating to the vehicle is received from the vehicle by means of a server outside the vehicle following start-up of a vehicle or of a control unit of the vehicle.

4. The method as claimed in claim 3, wherein the request message comprises at least one identifier that is representative of an update status of a navigation map of the vehicle.

5. The method as claimed in claim 4, wherein the navigation map is specified by the at least one received identifier.

6. The method as claimed in claim 1, wherein the navigation map is specified by at least one received identifier of the request message.

7. The method as claimed in claim 1, wherein ascertaining the change in traffic information for each road section of the navigation map comprises:

determining a relative change in the traffic information for each road section of the navigation map between a time of a past request message from the vehicle and a current time on the basis of the request message from the vehicle.

8. The method as claimed in claim 7, wherein determining the criticality value for the ascertained change in the traffic information for each road section of the navigation map comprises:

determining an amount of the ascertained change in the traffic information for each road section;

determining a visualization change for the ascertained change in the traffic information for each road section; and determining the criticality value based at least in part on the determined visualization change and on the amount of the ascertained change in the traffic information for each road section.

9. The method as claimed in claim 1, wherein determining the criticality value for the ascertained change in the traffic information for each road section of the navigation map comprises:

determining an amount of the ascertained change in the traffic information for each road section;

determining a visualization change for the ascertained change in the traffic information for each road section; and determining the criticality value on the basis of the determined visualization change and of the amount of the ascertained change in the traffic information for each road section.

10. The method as claimed in claim 1, wherein the ascertained change in the traffic information is a change in speed of vehicles on the road section.

11. The method as claimed in claim 1, wherein determining the relevance value for the ascertained change in the traffic information for each road section of the navigation map comprises:

ascertaining, at least in part using the server outside the vehicle, a current position of the vehicle;

determining a region around the current position of the vehicle and/or a region around a current navigation route of the vehicle; and ascertaining the relevance value for the ascertained change in the traffic information of a road section based at least in part on the current position of the vehicle, the region around the current position of the vehicle and/or the region around the current navigation route of the vehicle.

12. The method as claimed in claim 1, further comprising:

transmitting, from the server outside the vehicle to the vehicle, a different response message comprising an indication that the predefined threshold value has not been exceeded if the calculated volume of change does not exceed a predefined threshold value.

13. The method as claimed in claim 1, wherein the response message comprising the traffic information for the navigation map of the vehicle is transmitted from the server outside the vehicle to the vehicle using the Transport Protocol Experts Group protocol.

14. The method as claimed in claim 1, wherein the traffic information for the navigation map is transmitted in the response message by road section.

15. The method as claimed in claim 1, wherein the traffic information for a plurality of road sections is combined in the response message.

16. A non-transitory computer-readable medium for updating traffic information relating to a vehicle, wherein the computer-readable medium comprises instructions which, when executed on a computer and/or a control unit, perform the method as claimed in claim 1.

17. A system for updating traffic information relating to a vehicle, wherein the system is designed to perform the method as claimed in claim 1.

18. A vehicle comprising the system for updating traffic information relating to a vehicle as claimed in claim 17.

19. The method as claimed in claim 8, wherein determining the relevance value for the ascertained change in the traffic information for each road section of the navigation map comprises:

ascertaining, at least in part using the server outside the vehicle, a current position of the vehicle;

determining a region around the current position of the vehicle and/or a region around a current navigation route of the vehicle; and ascertaining the relevance value for the ascertained change in the traffic information of a road section based at least in part on the current position of the vehicle, the region around the current position of the vehicle and/or the region around the current navigation route of the vehicle.

20. The method as claimed in claim 1, wherein the relevance value for the ascertained change in the traffic information for each road section of the navigation map is determined at least in part on a current position of the vehicle, a current navigation route, and/or a historical driving profile of the vehicle.

* * * * *